United States Patent
Isaev et al.

(10) Patent No.: US 11,411,924 B2
(45) Date of Patent: Aug. 9, 2022

(54) METHOD FOR PERFORMING TLS/SSL INSPECTION BASED ON VERIFIED SUBJECT NAME

(71) Applicant: CHECK POINT SOFTWARE TECHNOLOGIES LTD., Tel Aviv (IL)

(72) Inventors: Pavel Isaev, Ashkelon (IL); Idan Sayag, Tel Aviv (IL); Alexey Volodin, Tel Aviv (IL); Tamir Zegman, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 768 days.

(21) Appl. No.: 16/226,661

(22) Filed: Dec. 20, 2018

(65) Prior Publication Data
US 2020/0204519 A1 Jun. 25, 2020

(51) Int. Cl.
*H04L 9/40* (2022.01)
*H04L 9/32* (2006.01)

(52) U.S. Cl.
CPC .......... *H04L 63/029* (2013.01); *H04L 9/3268* (2013.01); *H04L 63/166* (2013.01)

(58) Field of Classification Search
CPC . H04L 63/029; H04L 63/166; H04L 63/0236; H04L 63/0272; H04L 63/0281; H04L 63/0464; H04L 63/162; H04L 9/3268
USPC ........................................................ 713/151
See application file for complete search history.

(56) References Cited

U.S. PATENT DOCUMENTS

| | | | | |
|---|---|---|---|---|
| 8,549,157 B2* | 10/2013 | Schnellbaecher | ... | H04L 63/0884 709/229 |
| 8,700,892 B2* | 4/2014 | Bollay | ............... | H04L 63/0245 713/153 |
| 8,743,696 B2* | 6/2014 | Chowdhury | .......... | H04L 45/306 370/237 |
| 8,788,805 B2* | 7/2014 | Herne | .................. | H04L 63/062 713/153 |
| 9,172,682 B2* | 10/2015 | Bollay | ............... | H04L 63/0428 |
| 9,419,942 B1* | 8/2016 | Buruganahalli | .... | H04L 63/0227 |
| 9,930,067 B1* | 3/2018 | Johansson | .......... | H04L 63/0478 |
| 10,291,651 B1* | 5/2019 | Chaubey | ............. | H04L 63/0428 |
| 10,374,800 B1* | 8/2019 | Sharifi Mehr | ............ | H04L 9/14 |
| 2009/0220080 A1* | 9/2009 | Herne | .................. | H04L 9/0827 380/255 |
| 2011/0075675 A1* | 3/2011 | Koodli | ............... | H04L 12/1485 370/401 |
| 2011/0231649 A1* | 9/2011 | Bollay | ............... | H04L 63/0245 713/153 |

(Continued)

*Primary Examiner* — Samson B Lemma
(74) *Attorney, Agent, or Firm* — Mark M. Friedman

(57) ABSTRACT

Methods and systems for processing cryptographically secured connections by a gateway, between a client and a server, are performed. Upon receiving TCP and TLS/SSL handshakes associated with a client side connection, from a client (client computer) to the gateway, a probing connection is established. The probing connection completes the handshakes, and based on the completion of the handshakes, the gateway renders a decision, to bypass, block or inspect, the connections between the client and the server, allowing or not allowing data to pass through the connections between the client and the server.

21 Claims, 4 Drawing Sheets

(56) References Cited

U.S. PATENT DOCUMENTS

| | | | | |
|---|---|---|---|---|
| 2013/0024523 | A1* | 1/2013 | Albasheir | H04L 69/163 |
| | | | | 709/206 |
| 2016/0373414 | A1* | 12/2016 | Maccarthaigh | H04L 67/1004 |
| 2017/0078348 | A1* | 3/2017 | McGinnity | H04N 21/23418 |
| 2017/0223054 | A1* | 8/2017 | Wing | H04L 63/166 |
| 2018/0020246 | A1* | 1/2018 | Harrison | H04L 65/4069 |
| 2019/0014088 | A1* | 1/2019 | Subramaniyan | H04L 63/0281 |

* cited by examiner

METHOD FOR PERFORMING TLS/SSL INSPECTION BASED ON VERIFIED SUBJECT NAME

TECHNICAL FIELD

The present invention is directed to Transport Layer Security (TLS)/Secure Sockets Layer (SSL) encrypted traffic management.

BACKGROUND OF THE INVENTION

Transport Layer Security (TLS), and its predecessor, Secure Sockets Layer (SSL), are cryptographic protocols designed to provide communications security over a computer network. SSL and TLS are defined in a series of Request For Comments (RFCs), the latest is RFC 8446 (https://tools.ietf.org/html/rfc8446), this document is incorporated by reference herein. Several versions of the protocols find widespread use in applications such as serving web traffic. Encrypted web traffic typically needs to be inspected for security reasons, by security and other inspection devices. However, there are instances where web traffic should not be decrypted and inspected, such as in cases where it is needed to protect the privacy of an individual or an organization, or when following security policies, or regulations such as Health Insurance: Portability and Accountability Act (HIPAA) in the United States.

A Hypertext Transfer Protocol Secure (HTTPS) Inspection Rule Base is a set of rules used to define which HTTPS traffic will be decrypted and inspected by a Security Gateway, and which traffic including data, will be bypassed, for example, such that TLS/SSL inspection is not performed on the traffic. As a result of the bypass, the traffic passes through the security gateway to its intended destination. Rules in the rule base can match the connections by Internet Protocol (IP) addresses, transport layer information, such as Transmission Control Protocol (TCP) ports, as well as site's identity. TCP is defined in a series of Request For Comments (RFCs), such as RFC 793 (https://tools.ietf.org/html/rfc793), this document is incorporated by reference herein. This categorization process requires knowledge of the "subject name" of the web site.

One example for deciding on bypassing is shown in FIG. 1. Here, a contemporary bypass is performed by security gateways, e.g., a firewall 10, between a client, represented by the client computer 12 ("client" and "client computer" used interchangeably herein) and a server 14, along a communications network such as the Internet. The process involves a client side connection 20, between the client 12 and the firewall 10. The connection comprises a TCP handshake 20a between the firewall 10 and the client 12, followed by a Client Hello message 20b, sent from the client 12 to the firewall 10. The Client Hello message 20b is typically the first message of the connection. The firewall 10 analyzes the Client Hello message 20b, and Server Name Indication (SNI) information within the Client Hello message 20b. The SNI information is, for example, normally used in the TLS handshake 20a, to allow a server, which, for example, hosts multiple websites, to use the correct set of TLS/SSL credentials, for the requested web site. The Security Gateway, based on the SNI information, renders a decision 24, and then processes the traffic by either bypassing it, for example by forwarding encrypted and/or TLS/SSL handshake messages exchanged between the client and the server without altering them and/or decrypting them; inspecting it, for example by decrypting the traffic and performing additional security checks on the decrypted traffic; or blocking it, for example by dropping further packets belonging to the connection.

However, this method is imprecise and could lead to violations of the enterprise security policy. For example, a malicious client could send a Client Hello message that includes an innocent looking SNI extension. This could lead the Security Gateway to assume that the client is connecting to a legitimate website. However, the client is actually circumventing the Gateway security mechanisms in order to connect to a malicious website, or other site, which should be inspected or blocked according to the security policy of the Gateway.

SUMMARY OF THE INVENTION

The present invention is directed to an inspection decision mechanism. This mechanism provides a precise site identity that facilities, for example, security, privacy and improved connectivity. Security devices with this mechanism apply a rule base that determines which cryptographically protected traffic should be inspected, bypassed, for example, excluded from decryption, or blocked.

The present invention provides methods and systems for processing cryptographically secured connections by a gateway, between a client and a server. Upon receiving TCP and TLS/SSL handshakes associated with a client side connection, from a client (client computer) to the gateway, a probing connection is established. The probing connection completes the handshakes, and based on the completion of the handshakes, the gateway renders a decision, to bypass, block or inspect, the connections between the client and the server, allowing or not allowing data to pass through the connections between the client and the server.

The present invention provides a verified subject name, based on certificate authentication, to a rule base before an inspection/bypass/block decision is made. For example, a gateway analyzes a server certificate to identify a site. It does so by using a probing connection, which provides an additional security layer in the aforementioned inspection/bypass/block decision.

The probing connection allows the gateway to identify the site which is hosted on the server. The gateway opens a connection with the server, for example, by performing a TCP (Transmission Control Protocol) handshake with the server followed by a TLS/SSL handshake. In the TLS/SSL handshake, the gateway sends an SNI message (for example, based on an SNI message originally sent by the client to the gateway), followed by additional handshake messages between the gateway and the server, one of the messages being a server certificate message which includes, for example, a server certificate. The server certificate message is sent by the server to the gateway. The gateway analyzes the information sent by the server, including information found in the server certificate message, in order to determine the identity of the site.

Embodiments of the invention are directed to a method for processing cryptographically secured connections by a gateway between a client and a server. The method comprises: receiving a connection request from a client, responding to the received connection request by initiating a probing connection to the server, the probing connection including: 1) performing a cryptographic protocol with the server, the cryptographic protocol including causing the server to provide an indicator to a site hosted by the server; 2) receiving data from the server including an indicator to a site hosted by the server; and, 3) analyzing the received indicator to determine the identity of the site hosted by the server; and, processing the connection based, at least in part, on the determined identity of the site hosted by the server.

Optionally, the method is such that, the processing the connection includes a decision to block, inspect, or bypass the connection, where the decision is, at least in part, based on the determined identity.

Optionally, the method is such that, the cryptographic protocol includes a Transport Control Protocol (TCP) handshake and a Transport Layer Security (TLS) handshake.

Optionally, the method is such that, the received connection request includes a Client Hello message, and the TLS handshake includes a copy of the Client Hello message sent by the client including a Server Name Indication (SNI) extension.

Optionally, the method is such that, the indicator received from the server includes a server certificate.

Optionally, the method is such that, the site includes a website hosted by the server.

Optionally, the method is such that, the protocol includes at least one of: a Datagram Transport Layer Security (DTLS) handshake or a Quick UDP Internet Connections (QUIC) handshake.

Embodiments of the invention are directed to a computer system for processing cryptographically secured connections by a gateway between a client and a server. The computer system comprises: a storage medium for storing computer components, and, at least one processor for executing the computer components. The computer components comprise: a first computer component for receiving a connection request from a client; a second computer component for responding to the received connection request by initiating a probing connection to the server, the probing connection including: 1) performing a cryptographic protocol with the server, the cryptographic protocol including causing the server to provide an indicator to a site hosted by the server; 2) receiving data from the server including an indicator to a site hosted by the server; and, 3) analyzing the received indicator to determine the identity of the site hosted by the server. There is also a third component for processing the connection based, at least in part, on the determined identity of the site hosted by the server.

Optionally, the computer system additionally comprises a fourth component for deciding to block, inspect, or bypass the connection, where the decision is, at least in part, based on the determined identity.

Optionally, the computer system is such that, the cryptographic protocol includes a Transport Control Protocol (TCP) handshake and a Transport Layer Security (TLS) handshake.

Optionally, the computer system is such that, the received connection request includes a Client Hello message, and the TLS handshake includes a copy of the Client Hello message sent by the client including a Server Name Indication (SNI) extension.

Optionally, the computer system is such that, the indicator received from the server includes a server certificate.

Optionally, the computer system is such that, the site includes a website hosted by the server.

Optionally, the computer system is such that, the protocol includes at least one of: a Datagram Transport Security Protocol (DTLS) handshake or a Quick UDP Internet Connections (QUIC) handshake.

Embodiments of the invention are directed to a computer usable non-transitory storage medium having a computer program embodied thereon for causing a suitably programmed system to process cryptographically secured connections by a gateway between a client and a server, by performing the following steps when such program is executed on the system. The steps comprise: receiving a connection request from a client; responding to the received connection request by initiating a probing connection to the server, the probing connection including: 1) performing a cryptographic protocol with the server, the cryptographic protocol including causing the server to provide an indicator to a site hosted by the server; 2) receiving data from the server including an indicator to a site hosted by the server; and, 3) analyzing the received indicator to determine the identity of the site hosted by the server; and, processing the connection based, at least in part, on the determined identity of the site hosted by the server.

Optionally, the computer usable non-transitory storage medium is such that, the processing the connection includes a decision to block, inspect, or bypass the connection, where the decision is, at least in part, based on the determined identity.

Optionally, the computer usable non-transitory storage medium is such that, the cryptographic protocol includes a Transport Control Protocol (TCP) handshake and a Transport Layer Security (TLS) handshake.

Optionally, the computer usable non-transitory storage medium is such that, the received connection request includes a Client Hello message, and the TLS handshake includes a copy of the Client Hello message sent by the client including a Server Name Indication (SNI) extension.

Optionally, the computer usable non-transitory storage medium is such that, the indicator received from the server includes a server certificate.

Optionally, the computer usable non-transitory storage medium is such that, the site includes a website hosted by the server.

Optionally, the computer usable non-transitory storage medium is such that, the protocol includes at least one of: a Datagram Transport Security Protocol (DTLS) handshake or a Quick UDP Internet Connections (QUIC) handshake.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1:
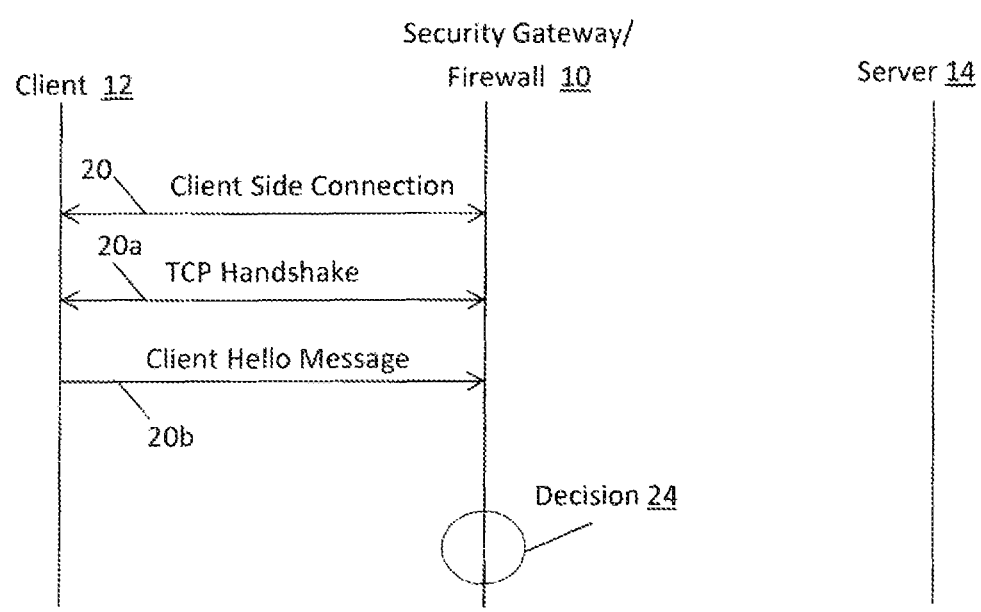
FIG. 1 is a diagram of an inspection decision mechanism in accordance with the prior art.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

The present invention is such that a client, via a client computer, attempts to connect to a server, such as a web server, through a gateway, such as a security gateway (GW), by a client side connection. A TLS handshake process initiates based on the aforementioned connection, with the client connection indicating the hostname, which it is attempting to connect to, by the client computer sending a Client Hello message with a Server Name Indication (SNI) extension.

Upon receiving the Client Hello message, the gateway holds the original connection, i.e., the client side connection. The gateway then initiates a probing (or probe) connection to the destination server. The probing connection includes a protocol formed by a TCP handshake and a TLS handshake. The TLS handshake comprises a new Client Hello message, based on the original Client Hello message including the SNI, in the client side connection. The server authenticates itself with its certificate based on the SNI extension. In order to complete the server authentication, the TLS handshake of the probe connection must be fully completed. The gateway uses the verified subject name for the rule-base matching of the original client side connection, and continues to process the original client side connection accordingly, such that data is transmitted between the client and the server, via the gateway.

Figure 2A:
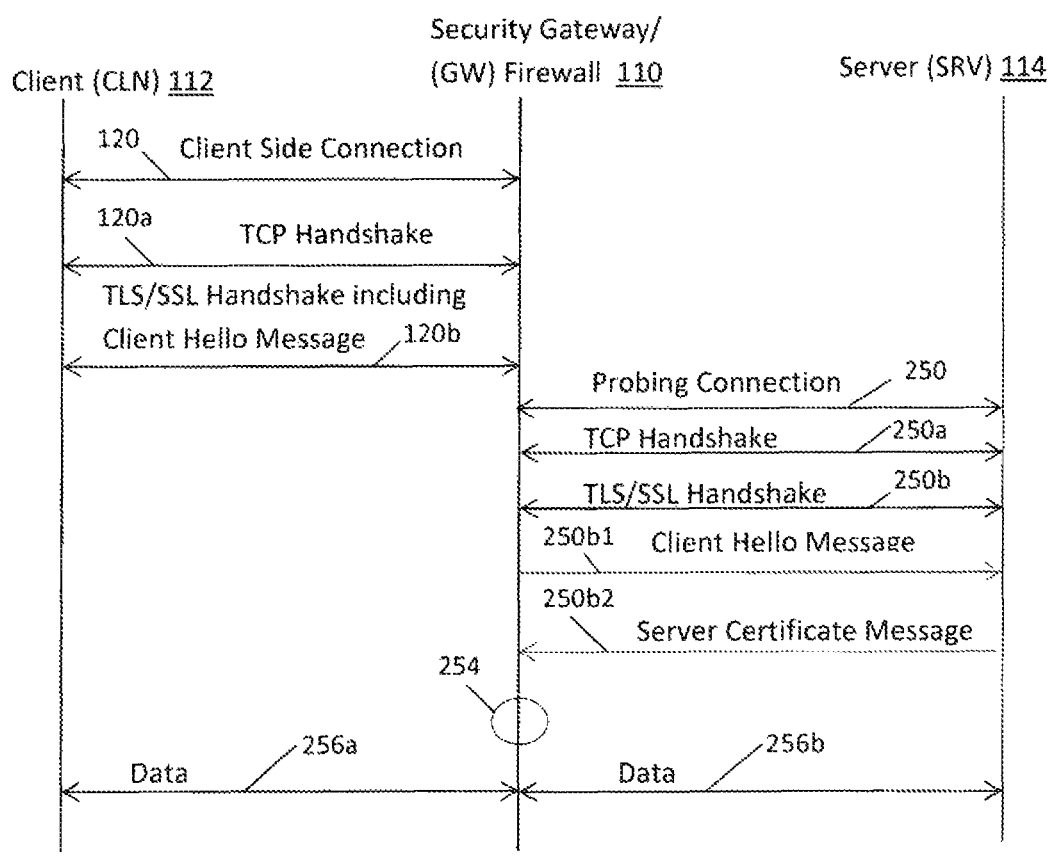
FIG. 2A is a diagram of an inspection decision mechanism in accordance with the present invention.
Figure 2B:
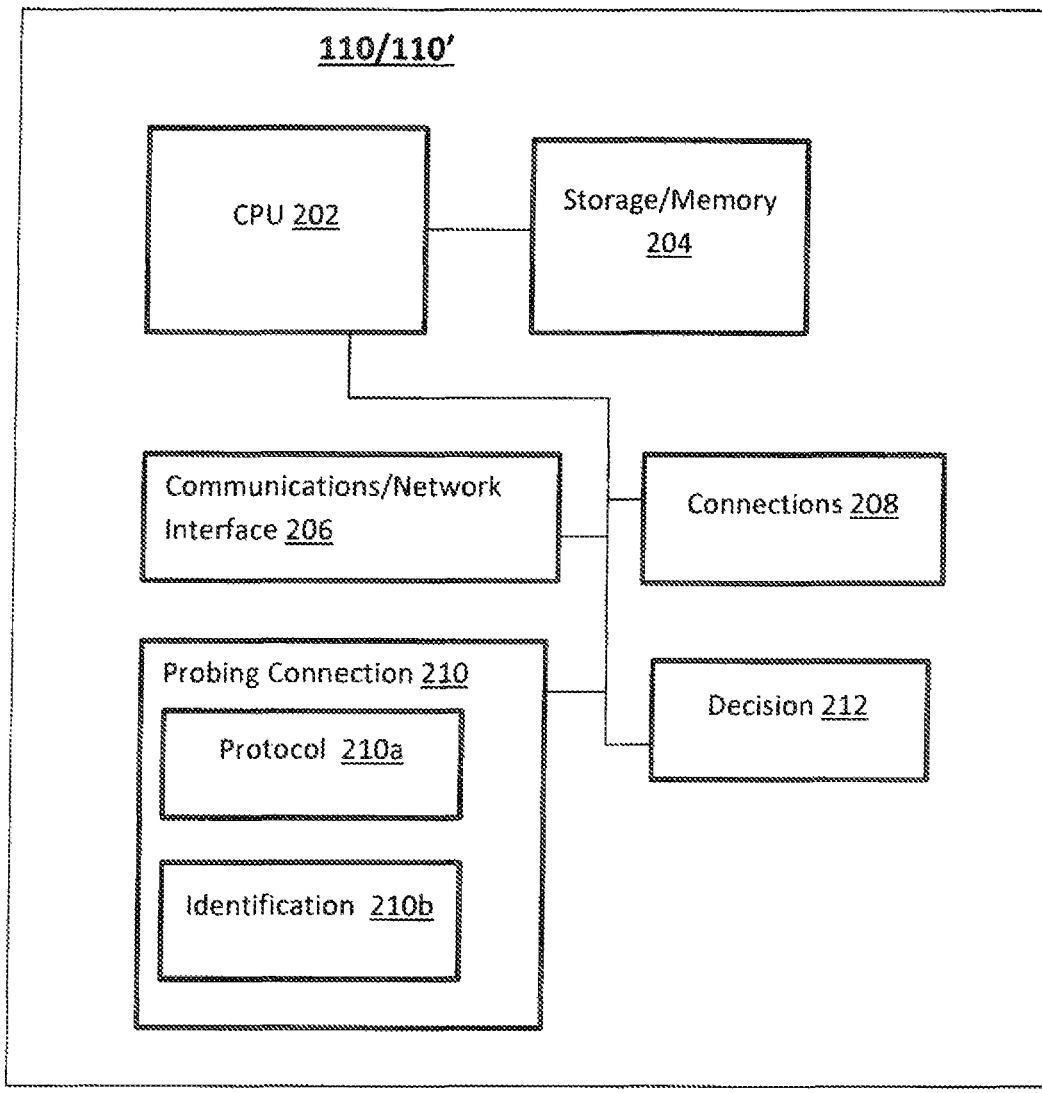
FIG. 2B is a diagram of the architecture of the gateway of FIG. 2A.

As shown in FIGS. 2A and 2B, the present invention is described herein with respect to a security gateway or gateway (GW) 110, such as a firewall, inspection device, networking device, including load balancers, traffic shapers, routers, or traffic analyzers, linked to a client, or client computer (CLN) 112 ("client" and "client computer" used interchangeably herein), and linked to a server (SRV) 114, such as a web server, over a communications network such as the Internet. "Linked" as used herein includes both wired or wireless links, either direct or indirect, and placing the computers, including, servers, components and the like, in electronic and/or data communications with each other. The client computer 112 connects to the server, 114, e.g., a web server, through the security gateway 110, as shown in FIG. 2A.

FIG. 2B shows an example gateway 110 and the system 110' therein. All components, including computer components, of the gateway 110 and/or system 110' are connected or linked to each other (electronically and/or data communication), either directly or indirectly.

Initially, the user gateway 110 (and system 110') includes a central processing unit (CPU) 202, a storage/memory 204, and computer components including, for example, a communications module/Network interface 206, a connections module 208, a probing connection module 210, and a decision module 212. The processors of the CPU 202 and the storage/memory 204, although shown as a single component for representative purposes, may be multiple components. The aforementioned components, e.g., computer components, 202, 204, 206, 208, 210, 212 of the system 110', for example, perform the process as shown in FIGS. 2A and 3, and described herein.

The CPU 202 is formed of one or more processors, including microprocessors, for performing the gateway 110 functions. The processors are, for example, conventional processors, including hardware processors, such as those used in servers, computers, and other computerized devices. For example, the processors may include x86 Processors from AMD and Intel, Xenon® and Pentium® processors from Intel, as well as any combinations thereof.

The storage/memory 204 is any conventional storage media. The storage/memory 204 stores machine executable instructions for execution by the CPU 202, to perform the processes of the invention, for example, as shown in FIGS. 2A and 3, and described herein.

Figure 3:
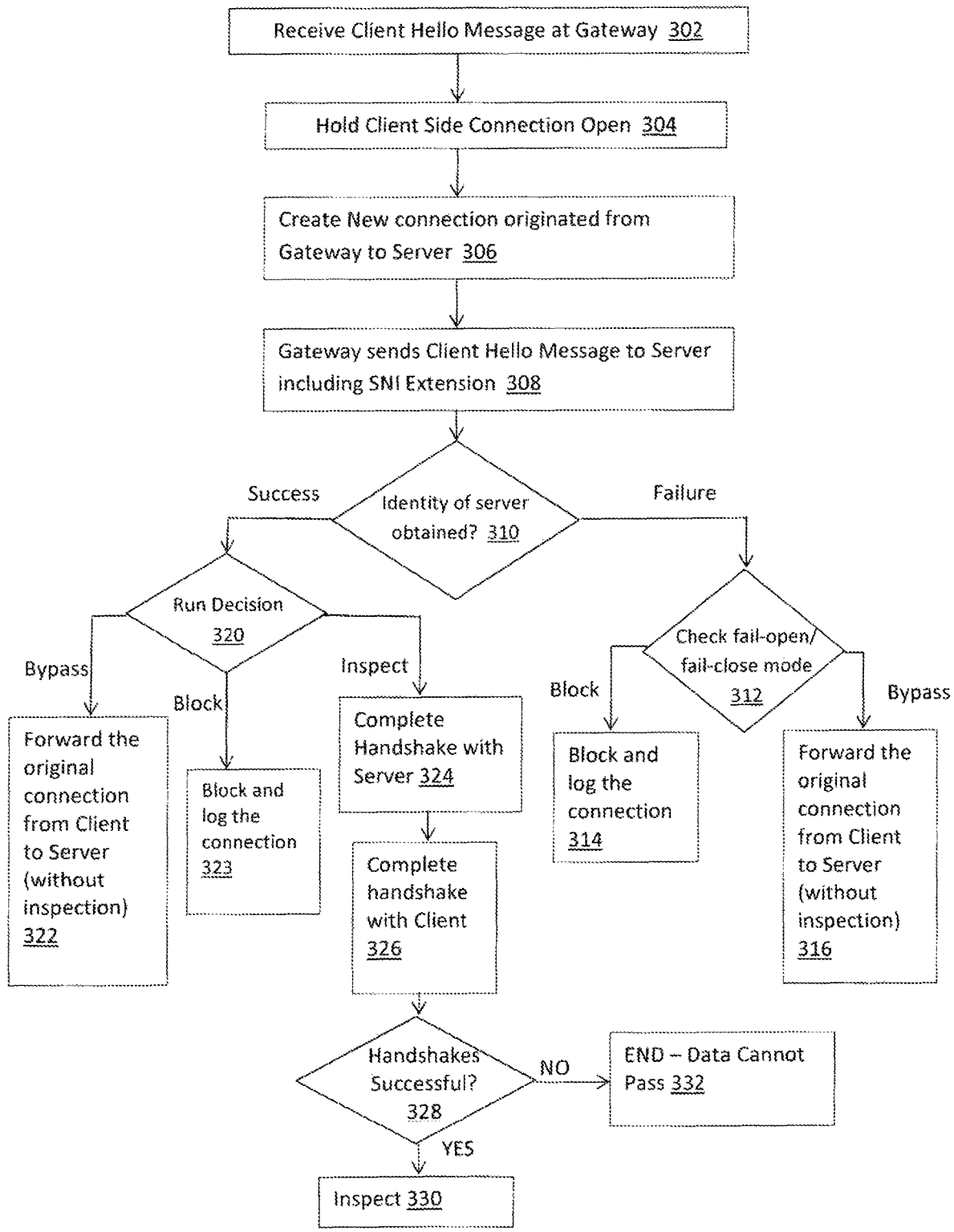
FIG. 3 is a flow diagram detailing an inspection decision process in accordance with the diagram of FIG. 2A.

The computer components, for example, modules 206, 208, 210 and 212, store instructions, for example, machine executable instructions, executable by the CPU 202, for performing the processes of the invention, for example, as shown in FIGS. 2A and 3, and described herein.

The communications/network interface module 206 receives all communications from both the client 112 and the server 114. Client (client side) 112 communications include communications associated with the client side connection 120, TCP handshake 120a, TLS/SSL handshake 120b and data transmission 256a. Server (server side 114) communications include those associated with the probing connection 250, TCP handshake 250a and TLS/SSL handshake 250b, and data transmission 256b.

The connections module 208 serves to maintain, including holding open, the connection, which was opened at the client side (client side connection 120). It also maintains data connections, such as the data connection 256b between the gateway 110 and the server 114.

The probing connection module 210 is associated with initiating and maintaining the probing connection. This module 210 includes a protocol module 210a and an identification module 210b. The protocol module 210a performs, e.g., transmits and/or maintains, cryptographic protocols, including the TCP handshake 250a, and the TLS/SSL handshake, copies the Client Hello message and prepares the copied Client Hello message 250b1 for sending (via the communications/network interface module 206), to the server 114. The identification module 210b obtains the server certificate message 250b2 (from the communications/network interface module 206) and from this message, determines the identity of the site hosted by the server 114.

The decision module 212 receives data from the probing connection module 210. From this data, the module 212 determines whether connections between the client 112 and the server 114, are to be blocked, inspected (and decrypted), or bypassed (and not decrypted).

Returning to FIG. 2A, the client, via client computer 112, initiates a client side connection 120 with the security gateway 110. The connection 120 is started with a TCP handshake process 120a followed by a TLS/SSL handshake 120b. The TLS handshake 120b includes a Client Hello message (CH) which comprises an SNI extension. The SNI extension is used by the client 110 to indicate which hostname the client is attempting to connect to.

With the Client Hello message 120b received at the security gateway 110, the security gateway 110 holds the client connection 120 open and initiates a probing connection 250 with the server 114. The probing connection 250 allows the gateway 110 to identify the site, for example, a web site, which is hosted on the server 114. The probing connection 250 is comprised of a TCP handshake 250a, a TLS/SSL handshake 250b. The TLS/SSL handshake 250b comprises a Client Hello Message 250b1 and a Server Certificate Message 250b2. The Client Hello Message 250b1 comprises an SNI extension which, for example, could be based on the SNI extension sent by the Client 112 or portions thereof. The Server Certificate Message 250b2 for example comprises a Server Certificate or portions thereof.

The server 114, for example, selects a set of credentials to authenticate itself. The selection of the set of credentials is, for example, based on the information found in the SNI extension in the Client Hello message 250b1 sent by the gateway 110. The SNI extension is in accordance with RFC 6066. "Transport Layer Security Extensions" (https://tools.ietf.org/html/rfc6066), this document is incorporated by reference herein. The server 114 sends a server certificate message 250b2 associated with said selected set of credentials to the security gateway 110. The gateway 110 analyzes the information sent by the server 114, including information found in the server certificate message, in order to determine the identity of the site. For example, the gateway 110 examines the server certificate and extracts certain pieces of information, such as the subject name or subject alternative names from the server certificate. This additional information is used to identify the server 114.

Having identified the server 114, the gateway 110 selects between the following actions for processing further traffic of the client side connection 120, using, for example, a rule base.

The selected action for processing further traffic includes a decision 254 which is one of:
1) Blocking the connection for example by dropping packets, sending TCP resets, sending TLS/SSL alert messages as well as notifying the client and or the server that the connection is not allowed.
2) Bypass the connection, for example by forwarding encrypted and/or TLS/SSL handshake messages exchanged between the client and the server without altering them and/or decrypting them.
3) Inspect the connection, for example by having the security gateway obtain the necessary cryptographic information such as cryptographic keys in order for it be able to perform one or more of the following:
   a. Decrypt the data
   b. Verify the authenticity and data integrity of the data
   c. Modify the data in a manner that would be acceptable by the receiver of the data
   d. Inject data in a manner that would be acceptable by the receiver of the data
   e. Delete data in a manner that would be acceptable by the receiver of the data When it is decided to inspect the connection, the gateway 110 completes the TLS/SSL handshake 250b with the server 114 and returns to using the Client Side Connection 120, that was on hold, and completes the TLS/SSL handshake 120b with the client 112.

Having completed the TLS/SSL handshake with the client 120b and the TLS/SSL handshake with the server 250b, the gateway 110 can inspect TLS/SSL protected data 256a sent by the client 112 and TLS/SSL protected data 206b sent by the server 114 via the gateway 110.

Alternatively, when it is decided to inspect the connection, the gateway 110, for example, blocks the probing connection and opens a new connection with the server 114. The gateway completes a TCP handshake and a TLS/SSL handshake with the server 114. Having completed the TLS/SSL handshake with the client 120b and the TLS/SSL handshake with the server 250b the gateway 110 can inspect TLS/SSL protected data 206a sent by the client 112 and TLS/SSL protected data 256b sent by the server 114 via the gateway 110.

Attention is now directed to FIG. 3, which shows a flow diagram detailing a computer-implemented process, for example, for processing cryptographically secured connections by a gateway 110 between a client 112 and a server 114, in accordance with embodiments of the disclosed subject matter. Reference is also made to elements shown in FIGS. 2A and 2B. Where a module of FIG. 2B is not provided as an example, the process may be, for example, performed by the CPU 202. The process and subprocesses of FIG. 3 are computerized processes, and can be, for example, performed manually, automatically, or a combination thereof, and, for example, in real time.

Initially, the security gateway 110 (e.g., gateway server) receives a Client Hello message 120b, as sent from the client 112, at block 302 (e.g., at the communications/network interface module 206). This client side connection 120 is held open at block 304 (e.g., by the connections module 208), and accordingly, remains open between the client computer 112 and the security gateway 110. The security gateway 110 then creates a new connection to the server 114, at block 306 (e.g., by the protocol module 210a of the probing connection module 210).

The security gateway 110 then sends a Client Hello message 250b1 including a server name indication (SNI) extension, over the newly opened connection with the server 114, at block 308. After block 308, the server 114, in response to receiving the Client Hello message 250b1, sends back a server certificate message 250b2, to the security gateway 110.

The process moves to block 310, where it is determined whether the identity of the site can be obtained from the server certificate message, received from the server 114 (e.g., by the identification module 210b of the probing connection module 210). If no at block 310, there is a failure and the system performs an error handling process in blocks 312, 314 and 316 (e.g., by the CPU 202). The process now moves from block 310 to block 312. At block 312, a check is made for fail-open/fail-close modes which determine how to handle such an error. The gateway 110 is, for example, configured to block the connection and log it, at block 314, or bypass the connection, without inspecting it, at block 316. The decision (e.g., made by the decision module 212) to block or bypass is, for example, based on configuration.

Returning to block 310, should the identity of the server have been obtained from the server certificate message 250*b*2 received, the process moves to block 320. At block 320, a policy decision is made using the obtained identity. This could, for example be performed using a rule base. A policy decision is made, and the decision 254 could be one of: 1) a bypass action (block 322), a block action (block 323), or an inspect action (block 324) (e.g., made by the decision module 212).

The process moves to block 322, where a bypass of the connection is performed. Here, the gateway 110 forwards TLS/SSL handshake messages as well as TLS/SSL protected data 256*a*, 256*b* between the client 112 and the server 114 without altering them and/or decrypting them.

Returning to block 320, if a block action is to be taken, the process moves to block 323, where the connection is blocked and logged, as the gateway 110 performs one of the following:

1) Drops further packets belonging to the client and/or server connection;
2) Sends a TCP reset packet to the client and/or the server;
3) Sends a TLS/SSL alert message to the client and/or the server; or,
4) Notifies the client and/or the server that the connection is blocked.

Returning to block 320, if a policy decision is to inspect, the process moves to block 324 where the gateway 110 completes the TLS/SSL handshake 250*b* with the server 114. The process moves to block 326, where the gateway 110 completes the TLS/SSL handshake 120*b* with the client 112. While the processes of blocks 324 and 326 are described in that order, the order of these blocks may be switched and the two can also be performed contemporaneously, including simultaneously.

The process moves to block 328 where it is determined whether the TLS/SSL handshakes 120*b*, 250*b* were completed successfully in accordance with the TLS/SSL protocols in blocks 324 and 326. If the handshakes are successful, the process moves to block 330 where data is now passed between the client computer 112 and the server 114, via and under the control of the gateway 110 (arrows 256*a* and 256*b*) and the gateway 110 performs inspection. The inspection performed by the gateway 110 may include one or more of the following:

1) Decrypting the data;
2) Verifying the authenticity and data integrity of the data;
3) Modifying the data in a manner that would be acceptable by the receiver of the data;
4) Injecting data in a manner that would be acceptable by the receiver of the data; or,
5) Deleting data in a manner that would be acceptable by the receiver of the data.

Returning to block 328, should one of the TLS/SSL handshakes not complete successfully, the process moves to block 332.

In block 332, the gateway 110, for example, drops the packets belonging to the connection, as the data is incompatible, and cannot pass.

In another embodiment of this invention a similar decision mechanism is employed on Datagram Transport Layer Security (DTLS) sessions. DTLS is a communication protocol, akin to TLS, that provides security for datagram-based applications that normally utilize the User Datagram Protocol (UDP) or the Datagram Congestion Control Protocol (DCCP) protocols. DTLS is defined in a series of Request For Comment (RFC) documents, such as: RFC 6347 (https://tools.ietf.org/html/rfc6347) and RFC 5238 (https://tools.ietf.org/html/rfc5238), both of which are incorporated here by reference. DTLS, is by design, very similar to TLS and uses basically the same set of messages such as Client Hello and Server Certificate. DTLS only makes minor changes that are needed in order to maintain a session over a datagram protocol. As will be appreciated by one skilled in the art, the same decision mechanism described above can be applied to DTLS sessions with only minor modification that relate to the use of a datagram protocol and to the minor differences between DTLS and TLS.

In another embodiment of this invention a similar decision mechanism is employed on Quick UDP Internet Connections (QUIC) sessions. QUIC is a UDP based multiplexed and secure transport protocol. QUIC is currently defined in an Internet Draft, the latest version is: https://tools.ietf.org/html/draft-ietf-quic-transport-16 which is hereby incorporated by reference. QUIC uses TLS to perform a cryptographic handshake. The cryptographic handshake is performed over the transport mechanism provided by QUIC. This handshake is described in an Internet Draft, the latest version is: https://tools.ietf.org/html/draft-ietf-quic-ds-16 which is hereby incorporated by reference. As will be appreciated by one skilled in the art, the same decision mechanism described above can be applied to QUIC sessions with only minor modification that relate to the use of QUIC as a transport protocol and to the minor adaptation QUIC makes to the use of TLS.

The process of FIGS. 2A and 3, for processing cryptographically secured connections by a gateway between a client and a server, is also stored, for example, as a computer program, on a computer usable non-transitory storage medium, such as compact discs and the like. When executed on a suitably programmed system, the computer program performs the aforementioned process.

The implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for processing cryptographically secured connections by a gateway between a client and a server comprising:
    receiving from the client a connection request that includes an indication of a site hosted by the server to which the client is attempting to connect;

upon receiving the connection request, always responding to the received connection request by initiating a probing connection to the server, the probing connection including:
   performing a cryptographic protocol with the server, the cryptographic protocol including causing the server to provide an indicator to a site hosted by the server;
   receiving data from the server including an indicator to a site hosted by the server; and,
   analyzing the received indicator to determine the identity of the site hosted by the server; and,
processing the connection based, at least in part, on the determined identity of the site hosted by the server.

2. The method of claim 1, wherein the processing the connection includes a decision to block, inspect, or bypass the connection, where the decision is, at least in part, based on the determined identity.

3. The method of claim 1, wherein the cryptographic protocol includes a Transport Control Protocol (TCP) handshake and a Transport Layer Security (TLS) handshake.

4. The method of claim 3, wherein the received connection request includes a Client Hello message, and the TLS handshake includes a copy of the Client Hello message sent by the client including a Server Name Indication (SNI) extension.

5. The method of claim 4, wherein the indicator received from the server includes a server certificate.

6. The method of claim 1, wherein the site includes a website hosted by the server.

7. The method of claim 2 wherein the protocol includes at least one of: a Datagram Transport Layer Security (DTLS) handshake or a Quick UDP Internet Connections (QUIC) handshake.

8. A computer system for processing cryptographically secured connections by a gateway between a client and a server comprising:
   a storage medium for storing computer components; and,
   at least one processor for executing the computer components comprising:
      a first computer component for receiving from the client a connection request that includes an indication of a site hosted by the server to which the client is attempting to connect;
      a second computer component for, upon receiving the connection request, always responding to the received connection request by initiating a probing connection to the server, the probing connection including:
         performing a cryptographic protocol with the server, the cryptographic protocol including causing the server to provide an indicator to a site hosted by the server;
         receiving data from the server including an indicator to a site hosted by the server; and,
         analyzing the received indicator to determine the identity of the site hosted by the server; and,
      a third component for processing the connection based, at least in part, on the determined identity of the site hosted by the server.

9. The computer system of claim 8, additionally comprising a fourth component for deciding to block, inspect, or bypass the connection, where the decision is, at least in part, based on the determined identity.

10. The computer system of claim 9, wherein the cryptographic protocol includes a Transport Control Protocol (TCP) handshake and a Transport Layer Security (TLS) handshake.

11. The computer system of claim 10, wherein the received connection request includes a Client Hello message, and the TLS handshake includes a copy of the Client Hello message sent by the client including a Server Name Indication (SNI) extension.

12. The computer system of claim 11, wherein the indicator received from the server includes a server certificate.

13. The computer system of claim 8, wherein the site includes a website hosted by the server.

14. The computer system of claim 9, wherein the protocol includes at least one of: a Datagram Transport Security Protocol (DTLS) handshake or a Quick UDP Internet Connections (QUIC) handshake.

15. A computer usable non-transitory storage medium having a computer program embodied thereon for causing a suitably programmed system to process cryptographically secured connections by a gateway between a client and a server, by performing the following steps when such program is executed on the system, the steps comprising:
   receiving from the client a connection request that includes an indication of a site hosted by the server to which the client is attempting to connect;
   upon receiving the connection request, always responding to the received connection request by initiating a probing connection to the server, the probing connection including:
      performing a cryptographic protocol with the server, the cryptographic protocol including causing the server to provide an indicator to a site hosted by the server;
      receiving data from the server including an indicator to a site hosted by the server; and,
      analyzing the received indicator to determine the identity of the site hosted by the server; and,
   processing the connection based, at least in part, on the determined identity of the site hosted by the server.

16. The computer usable non-transitory storage medium of claim 15, wherein the processing the connection includes a decision to block, inspect, or bypass the connection, where the decision is, at least in part, based on the determined identity.

17. The computer usable non-transitory storage medium of claim 16, wherein the cryptographic protocol includes a Transport Control Protocol (TCP) handshake and a Transport Layer Security (TLS) handshake.

18. The computer usable non-transitory storage medium of claim 17, wherein the received connection request includes a Client Hello message, and the TLS handshake includes a copy of the Client Hello message sent by the client including a Server Name Indication (SNI) extension.

19. The computer usable non-transitory storage medium of claim 18, wherein the indicator received from the server includes a server certificate.

20. The computer usable non-transitory storage medium of claim 15, wherein the site includes a website hosted by the server.

21. The computer usable non-transitory storage medium of claim 16, wherein the protocol includes at least one of: a Datagram Transport Security Protocol (DTLS) handshake or a Quick UDP Internet Connections (QUIC) handshake.

* * * * *